(12) United States Patent
Coppola et al.

(10) Patent No.: US 11,171,545 B2
(45) Date of Patent: Nov. 9, 2021

(54) REINFORCED STATOR HOUSING FOR AN ELECTRIC MOTOR

(71) Applicant: GM GLOBAL TECHNOLOGY OPERATIONS LLC, Detroit, MI (US)

(72) Inventors: Anthony M. Coppola, Rochester Hills, MI (US); Alireza Fatemi, Canton, MI (US); Bradley A. Newcomb, Troy, MI (US); Derek F. Lahr, Howell, MI (US); Sean R. Wagner, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 16/662,862

(22) Filed: Oct. 24, 2019

(65) Prior Publication Data

US 2021/0126511 A1    Apr. 29, 2021

(51) Int. Cl.
*H02K 9/197*    (2006.01)
*H02K 5/04*     (2006.01)
*H02K 7/00*     (2006.01)
*H02K 1/18*     (2006.01)

(52) U.S. Cl.
CPC ............. *H02K 9/197* (2013.01); *H02K 1/182* (2013.01); *H02K 5/04* (2013.01); *H02K 7/006* (2013.01)

(58) Field of Classification Search
CPC ........... H02K 1/146; H02K 9/19; H02K 7/116

USPC ........ 310/216.125, 402, 403, 431, 432, 413, 310/415, 426
See application file for complete search history.

(56) References Cited

U.S. PATENT DOCUMENTS

| | | | |
|---|---|---|---|
| 2003/0042817 A1* | 3/2003 | Tsuneyoshi | H02K 9/197 310/216.014 |
| 2013/0193784 A1* | 8/2013 | Zheng | H02K 1/185 310/51 |
| 2017/0373545 A1* | 12/2017 | Zhong | H02K 5/08 |
| 2019/0363598 A1* | 11/2019 | Coppola | H02K 3/24 |

FOREIGN PATENT DOCUMENTS

JP          2002281698 A  *  9/2002

* cited by examiner

*Primary Examiner* — Jose A Gonzalez Quinones
(74) *Attorney, Agent, or Firm* — Quinn IP Law (57) ABSTRACT

A stator assembly for an electric motor includes a laminate steel core arranged on an axis. The stator assembly also includes a fluid inlet and a fluid outlet. The stator assembly additionally includes a stator housing arranged on the axis concentrically with respect to the laminate steel core. The stator housing has a conduit fluidly connected to each of the fluid inlet and the fluid outlet and configured to circulate fluid around the laminate steel core. The stator assembly also includes a structural skeleton embedded in the stator housing. The structural skeleton is thereby configured to reinforce the stator housing. An electric motor employing the above-described stator assembly is also contemplated.

20 Claims, 6 Drawing Sheets

REINFORCED STATOR HOUSING FOR AN ELECTRIC MOTOR

INTRODUCTION

The disclosure relates to a reinforced stator housing for a stator assembly of an electric motor.

An electric motor is a type of a machine that converts electric energy into mechanical energy. Electric motors may be configured as an alternating current (AC) or a direct current (DC) type. Electric motors operate through interacting magnetic fields and current-carrying conductors to generate force. Recent technological advances have facilitated development of compact, high-power electric motors for high-volume applications, such as for powering a vehicle, i.e., a hybrid or electric vehicle.

A stator is the stationary part of a rotor system found in electric motors. The stator may either include permanent magnets or electromagnet windings formed from magnet bars or wires. Depending on the configuration of the electric motor, the stator may act as a field magnet for interacting with an armature to generate motion, or it may act as the armature, receiving its influence from moving field coils on the rotor. The stator components are generally encased in a stator housing.

SUMMARY

A stator assembly for an electric motor includes a laminate steel core arranged on an axis. The stator assembly also includes a fluid inlet and a fluid outlet. The stator assembly additionally includes a stator housing arranged on the axis concentrically with respect to the laminate steel core. The stator housing has a conduit fluidly connected to each of the fluid inlet and the fluid outlet and configured to circulate fluid around the laminate steel core. The stator assembly also includes a structural skeleton embedded in the stator housing. The structural skeleton is thereby configured to reinforce the stator housing, i.e., support and enhance stiffness of the stator housing.

The stator housing may be fixed to the laminate steel core via an interlocking feature.

The interlocking feature may include serrations or ribs extending along the axis and in positive engagement with the stator housing.

The stator housing may be constructed from a polymeric material.

The structural skeleton may be constructed from a continuous fiber composite, metal, or polymeric material.

The structural skeleton may include a first set of members extending along the axis and a second set of members arranged at a non-zero angle with respect to the axis. In such an embodiment, the second set of members may be fixed to the first set of members via an adhesive or a weld, or by being snapped together.

The structural skeleton may be directly affixed to the laminate steel core, such as via insertion of one end of the structural skeleton directly into the laminate steel core.

The stator assembly may also include a rotor bearing and a housing cap mounted to the stator housing. The stator assembly may further include a rotor bearing bushing configured to support the rotor bearing, embedded in the housing cap, and fixedly connected with the structural skeleton.

The structural skeleton may extend along the axis through the stator housing.

The stator assembly may also include wire windings arranged on and supported by the laminate steel core and having winding end-turns. The stator assembly may further include an end cap arranged on and configured to encapsulate the winding end-turns. The end cap may have a fluid passage in fluid communication with the conduit and configured to circulate fluid around the winding end-turns.

An electric motor employing the above-described stator assembly is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
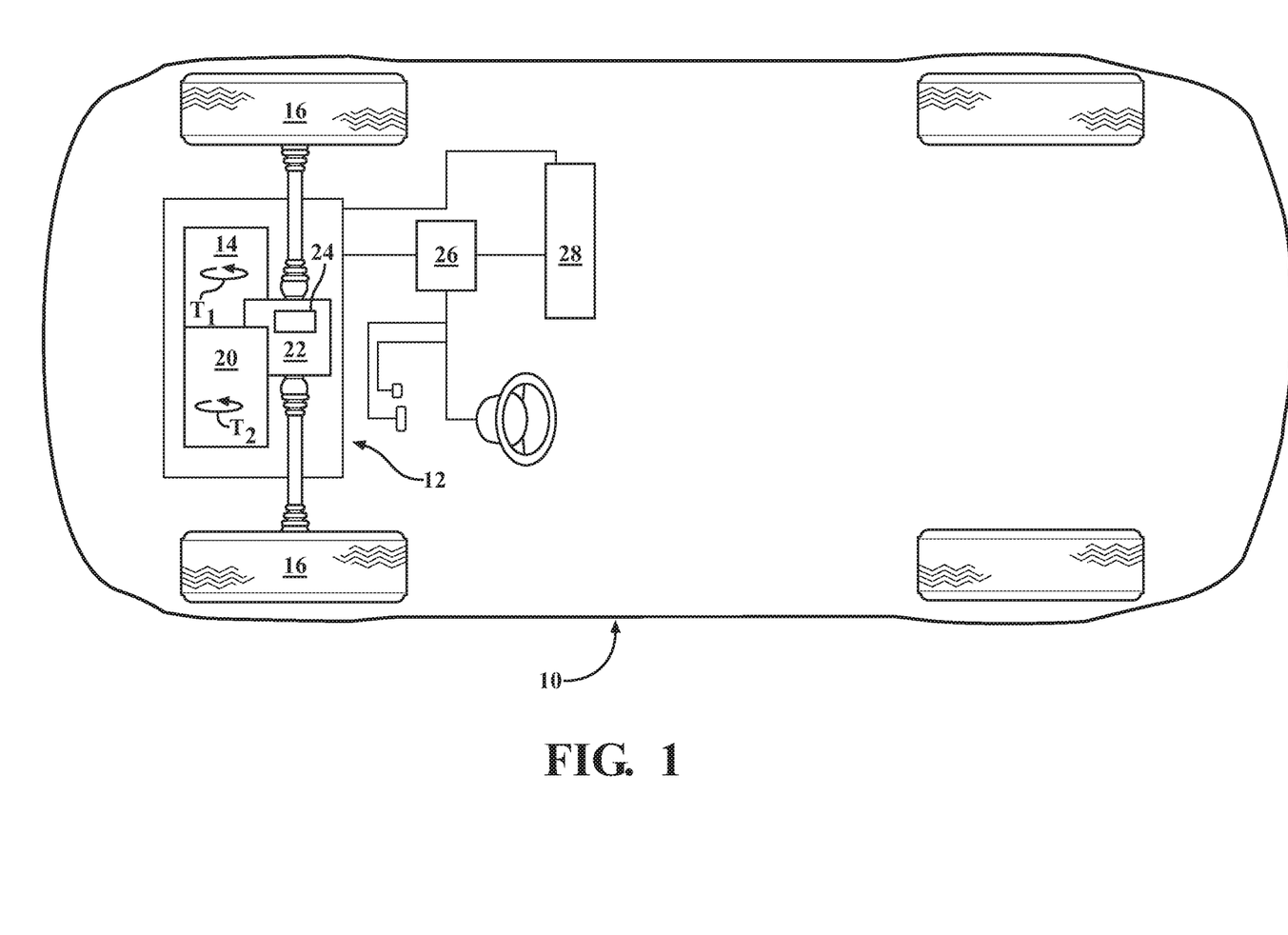
FIG. 1 is a schematic illustration of a motor vehicle employing an electric motor for propulsion.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque T1 (shown in FIG. 1) for propulsion of the vehicle 10 via driven wheels 16 relative to a road surface 18.

As shown in FIG. 1, the powertrain 12 may also include a second power-source 20, such as an internal combustion engine configured to generate a second power-source torque T2. The power-sources 14 and 20 may act in concert to power the vehicle 10 and be operatively connected to a transmission assembly 22. The transmission assembly 22 may be configured to transmit first and/or second power-source torques T1, T2 to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10. As shown, the vehicle 10 additionally includes a programmable electronic controller 26 configured to control the powertrain 12 to generate a predetermined amount of power-source torque T, and various other vehicle systems. The vehicle 10 additionally includes an energy storage system 28, such as one or more batteries, configured to generate and store electrical energy for powering the power-sources 14 and 20.

Figure 2:
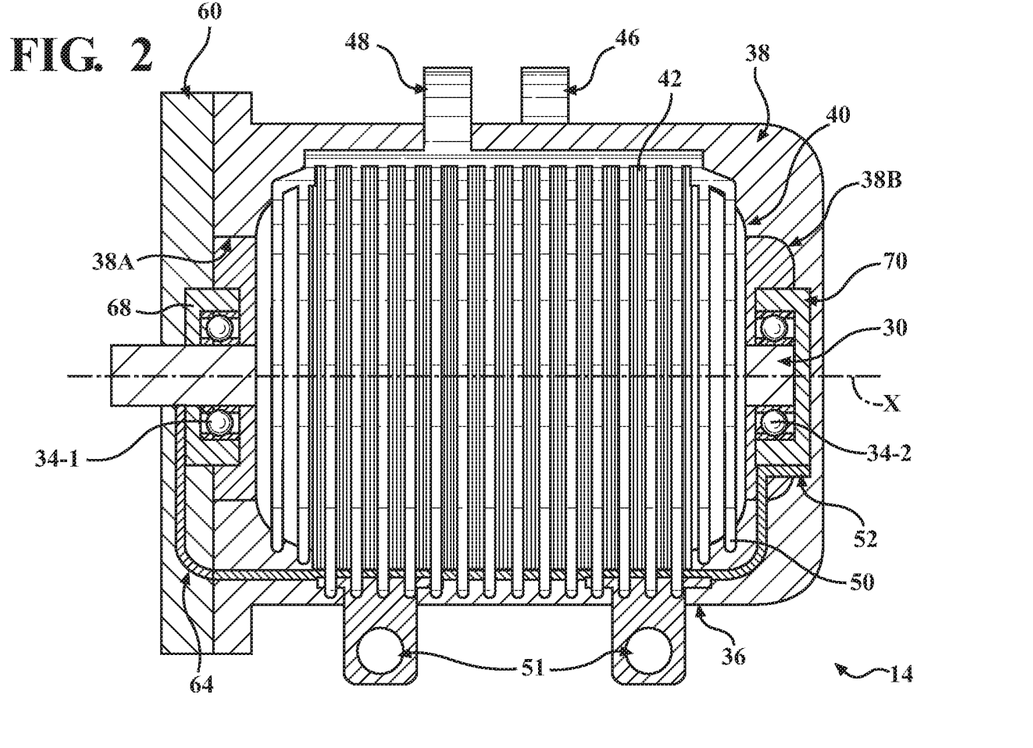
FIG. 2 is a schematic close-up cross-sectional side view of the motor-generator shown in FIG. 1, depicting an embodiment of a stator assembly having stator wire windings, a structural skeleton affixed to a stator housing, and one housing cap with an embedded cap skeleton portion, according to the disclosure.
Figure 3:
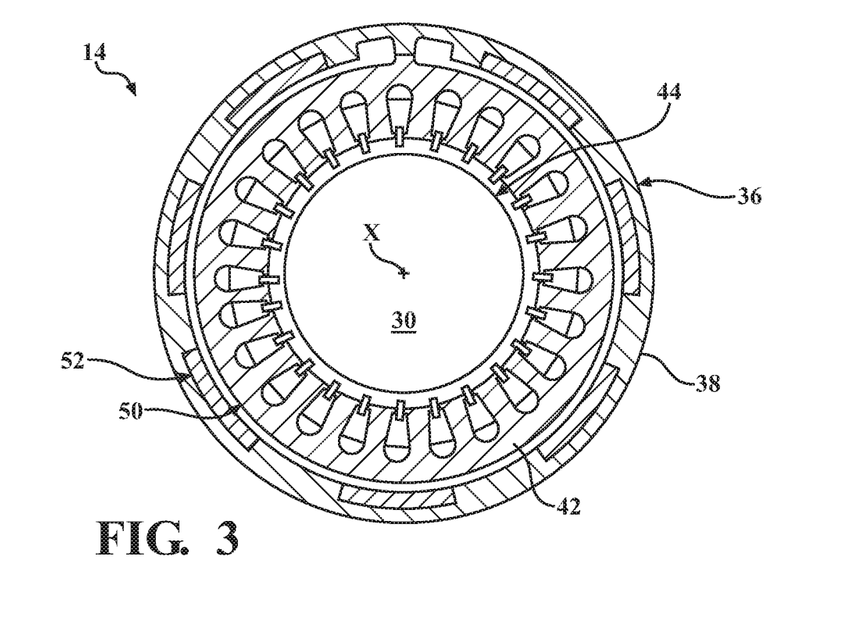
FIG. 3 is a schematic cross-sectional front view of the stator assembly shown in FIG. 2.

As shown in FIG. 2, the motor-generator 14 includes a rotor 30 employing conductors 32. The rotor 30 is supported for rotation by bearings 34-1, 34-2 and configured to output the first power-source torque T1. The motor-generator 14 also includes a stator assembly 36. The stator assembly 36 generally surrounds the rotor 30 and is fixed with respect to the second power-source 20, the transmission assembly 22, the final drive unit 24, or the structure of the vehicle 10. The stator assembly 36 includes a stator case or housing 38. The stator assembly 36 also includes a laminate steel core 42 with wire windings 40, and arranged on an axis X. The wire windings 40 are arranged on and supported by the laminate steel core 42 and include winding end-turns 40A. The wire windings 40 are configured to produce a rotating magnetic field, which spins the rotor 30, thus generating the first power-source torque T1.

The laminate steel core 42 is assembled with, i.e., inserted into, the stator housing 38 and fixed therein. As shown, in the stator assembly 36, the stator housing 38 is arranged on the axis X concentrically with respect to the laminate steel core 42. As a result, the rotor 30 is configured to rotate inside the stator assembly 36 about the axis X during pertinent operation of the hybrid powertrain 12. A clearance or air gap 44 is defined, i.e., present, between the rotor 30 and the laminate steel core 42 for no-contact rotation between the rotor and the stator assembly 36. The stator assembly 36 includes a fluid inlet 46 and the fluid outlet 48 fluidly connected to a plurality of channels or conduits 50 configured to receive and circulate a fluid for heating and/or cooling the stator assembly, including the laminate steel core 42. Each of the fluid inlet 46 and the fluid outlet 48 may be configured as respective manifolds connecting the plurality of conduits 50. As shown, the conduits 50 are defined by the stator housing 38.

As shown, each of the fluid inlet 46 and the fluid outlet 48 extends through to the exterior surface of the stator housing 38 and may connect to an external fluid source, such as a fluid pump (not shown). The stator housing 38 is constructed from a polymeric or polymer-based material, such as a polymer composite, for the subject material's advantageously low mass, as compared to, for example, steel and other metals. Additionally, a polymer-based stator housing 38 may effectively mask or insulate noise generated by the motor-generator 14 during the motor's operation. A polymer-based stator housing 38 may be manufactured via open molding, closed molding, or cast polymer molding. Such manufacturing processes maybe used to form the conduits 50 in the net, as-molded shape of the stator housing 38, thereby permitting the housing to forego post-processing in the conduit area. As also shown, the stator housing 38 may include mounting bosses 51 configured to permit fastening and fixing the motor-generator 14 to the second power-source 20, the transmission assembly 22, or the final drive unit 24.

Figure 5:
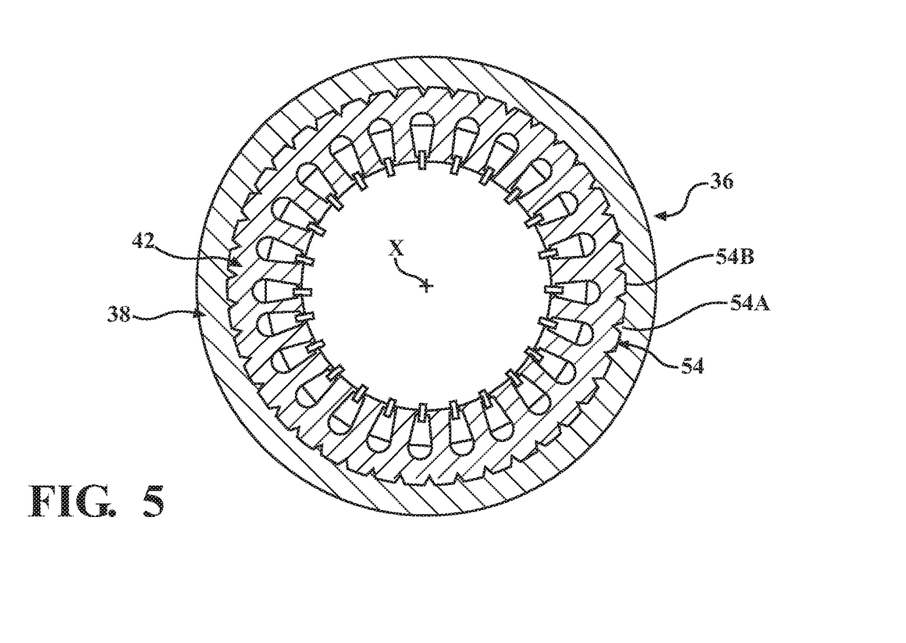
FIG. 5 is a schematic cross-sectional front view of the stator housing affixed to the laminate steel core via an interlocking feature.

The stator assembly 36 also includes a structural skeleton 52 embedded in and reinforcing the stator housing 38. In other words, the structural skeleton 52 is configured to support the stator housing 38 and enhance stiffness of the stator housing during operation of the motor-generator 14. As shown, the structural skeleton 52 may be exposed from inside the housing 38 to the laminate steel core 42 or be completely over-molded by the housing material. For structural integrity and stiffness, the structural skeleton 52 may be constructed from a continuous fiber composite, metal, or polymeric material. As shown in FIG. 5, the stator housing 38 may be fixed to the laminate steel core 42 via an interlocking feature or interface 54. The interlocking feature 54 may include serrations or ribs 54A in the steel core 42 extending along the axis X and in positive engagement with complementary projections 54B of the stator housing 38. The projections 54B may be formed in the stator housing 38 during molding thereof. Specifically, the interlocking feature 54 may be generated by the laminate steel core 42 being positioned within the mold, permitting the projections 54B of the stator housing 38 to be formed around the ribs 54A of the steel core during the molding process.

Figure 6:
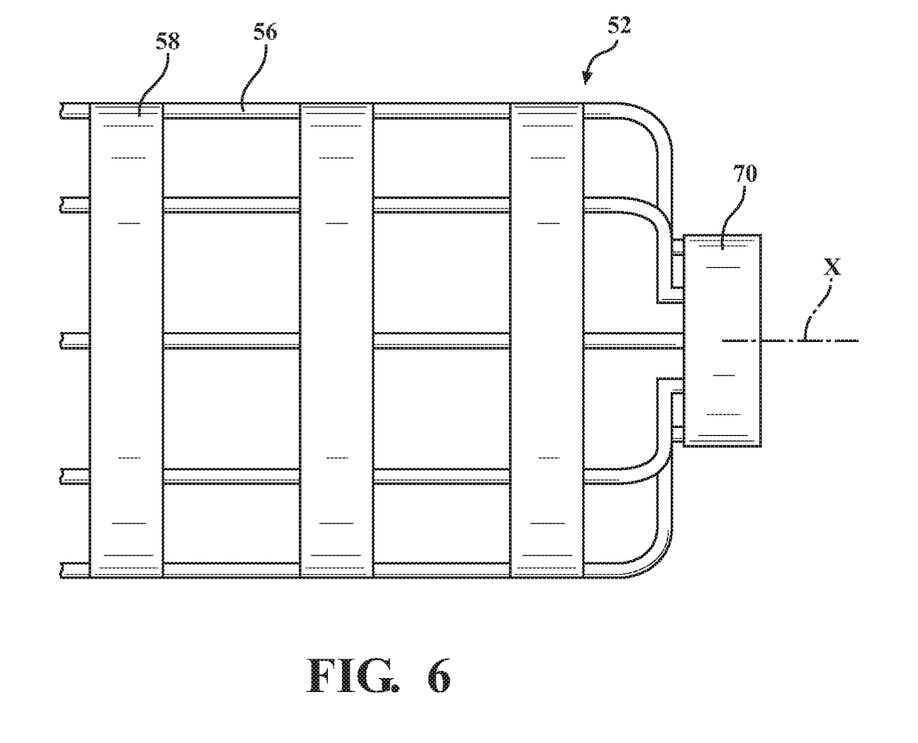
FIG. 6 is a schematic cross-sectional side view of an embodiment of the structural skeleton construction having first and second set of skeleton members with complementary geometries.

The structural skeleton 52 may be affixed directly to the laminate steel core 42 for being subsequently over-molded with material of the housing 38. In other words, the structural skeleton 52 and the laminate steel core 42 may be arranged and located with respect to one another in a mold fixture (not shown), with the material of the housing 38 introduced into the mold thereby solidifying the stator housing 38 structure. In one embodiment, as shown in FIG. 6, the structural skeleton 52 may include a first set of members 56 extending along, i.e., substantially parallel, to the axis X and a second set of members 58 arranged concentrically with respect to the subject axis. For example, the second set of members 58 may be arranged substantially perpendicular to the first set of members 56. Alternatively, construction of the structural skeleton 52 may be topologically optimized, i.e., skewed or shaped to follow direction of principle stress experienced by the stator assembly 36 and the stator housing 38. In such a construction, the second set of members 58 may be oriented at various angles, including zero, relative to each other, and at various non-zero angles to the first set of members 56 and to the axis X.

Figure 7:
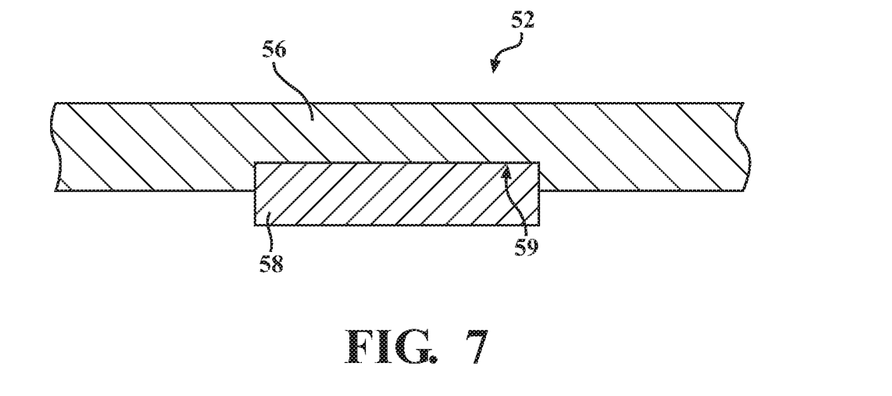
FIG. 7 is a schematic partial cross-sectional side view of an embodiment of the structural skeleton construction shown in FIG. 6, specifically depicting the first skeleton member having a notch provided to accept the second skeleton member.

The first and second set of members 56, 58 may be constructed from the same material. The second set of members 58 may be fixed to the first set of members 56 via an adhesive or a weld to hold the structural skeleton 52 together until it is over-molded with the stator housing 38. Alternatively, the first and second set of members 56, 58 may include complementary geometries, such as one or more notches 59 (shown in FIG. 7) provided in the first member 56 to accept each of the second members 58, and permit the respective first and second members to be snapped together. Such a construction of the structural skeleton 52 is similarly intended to permit the first and second members to be fit and held together until the structural skeleton is over-molded with the stator housing 38.

Figure 8:
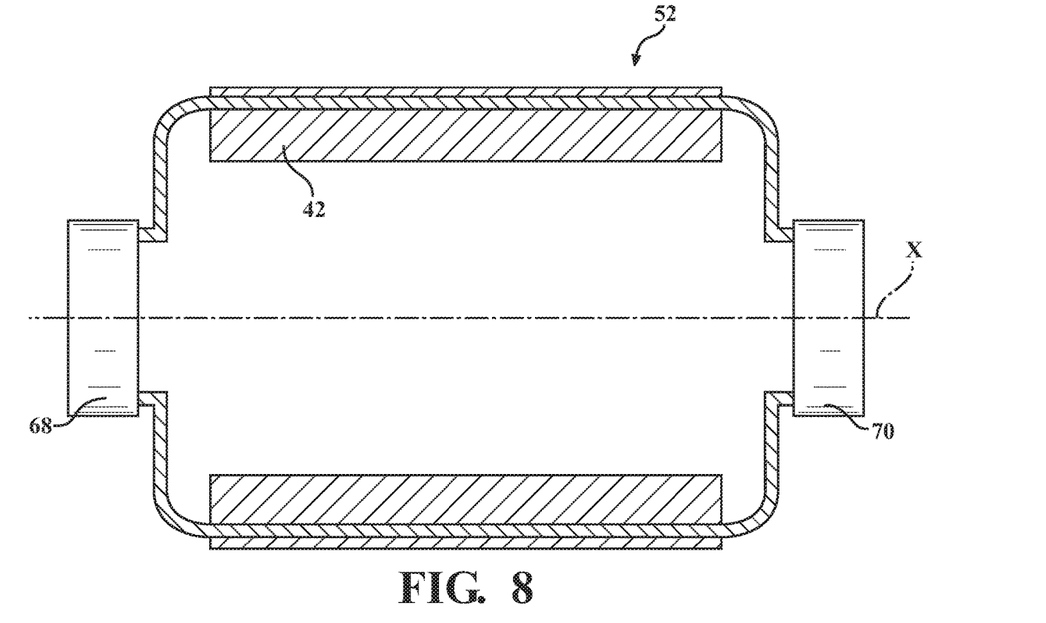
FIG. 8 is a schematic cross-sectional side view of another embodiment of the structural skeleton.
Figure 9:
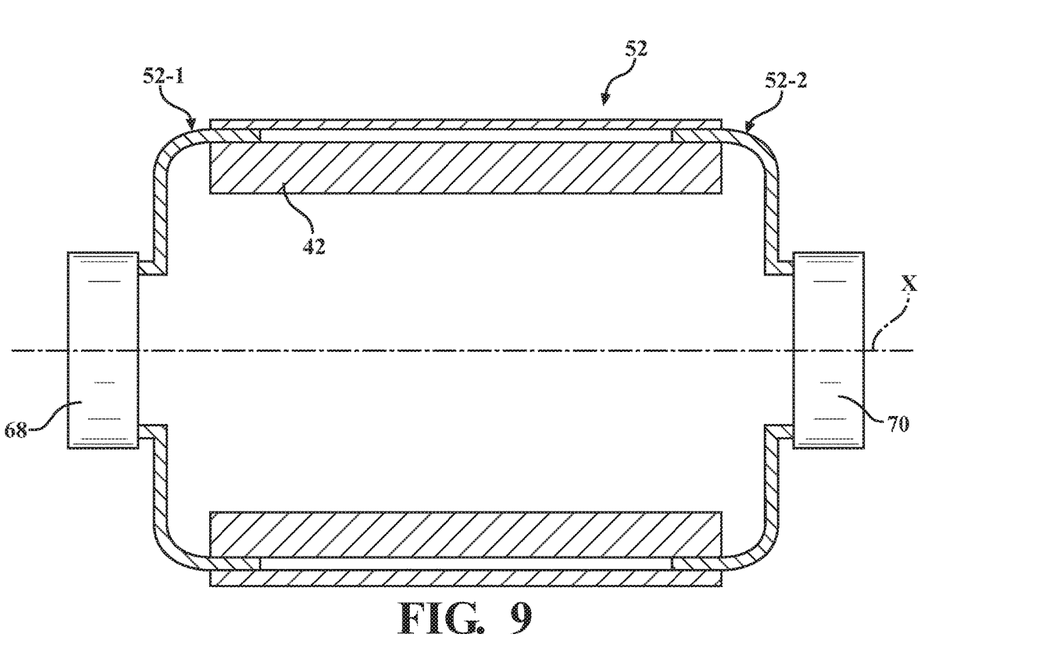
FIG. 9 is a schematic cross-sectional side view of yet another embodiment of the structural skeleton.
Figure 10:
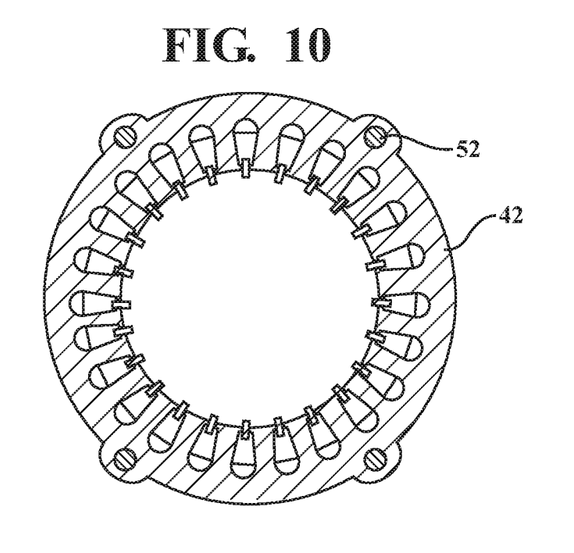
FIG. 10 is a schematic cross-sectional front view of the stator assembly shown in FIGS. 8 and 9.

A free-standing structural skeleton 52 pre-assembled from the first and second sets of members 56, 58 is not required to have significant load-bearing capacity, as the first and second set of members are intended to be held together for the purposes of maintaining their relative positioning for and during the molding process. Once the first and second set of members 56, 58 have been over-molded by the stator housing 38 and joined with the laminate steel core 42, the entire structure of the stator assembly 36 becomes an integrated, rigid whole. As shown in FIGS. 8 and 10, the structural skeleton 52 may extend along the axis X through the stator housing 38. In such an embodiment, generation of the stator assembly 36 includes the structural skeleton 52 being over-molded with the material of stator housing 38. In another embodiment, as shown in FIG. 9, the structural skeleton 52 may include a first skeleton portion 52-1 and a second skeleton portion 52-2. The first skeleton portion 52-1 and the second skeleton portion 52-2 may be inserted directly into and fixed in the respective opposite ends of the laminate steel core 42. Alternatively, the first skeleton portion 52-1 and the second skeleton portion 52-2 may be embedded into attachable housing caps, which will be described in detail below, and fastened to opposite ends of the laminate steel core 42.

Figure 4:
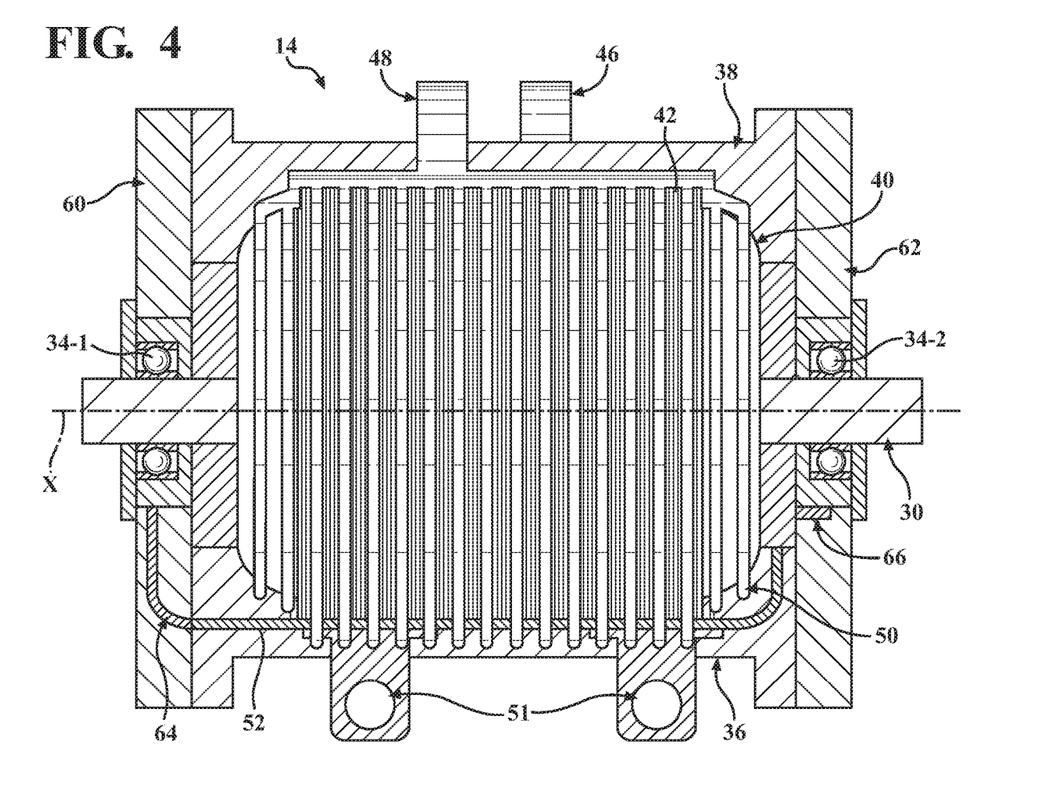
FIG. 4 is a schematic close-up cross-sectional side view of the motor-generator shown in FIG. 1, depicting another embodiment of the stator assembly having a stator housing reinforced by a structural skeleton, and two opposing housing caps, each with an embedded cap skeleton portion, according to the disclosure.

With resumed reference to FIGS. 2 and 4, the stator assembly 36 may be configured to support the rotor bearings 34-1, 34-2. The stator assembly 36 may include respective opposing first and second housing caps 60, 62 attached or mounted to the stator housing 38 (shown in FIG. 4). In such an arrangement of the stator assembly 36, the rotor 30 may be loaded into the stator assembly from either end of the stator housing, as will be explained further below. The first and second housing caps 60, 62 may include respective embedded first and second cap skeleton portions 64, 66. For structural integrity and stiffness, the first and second cap skeleton portions 64, 66 may be constructed from a continuous fiber composite, metal, or thermoplastic material. The first and second cap skeleton portions 64, 66 are configured to support and contribute to the integrity of the first and second housing caps 60, 62 during operation of the motor-generator 14. The stator assembly 36 may further include rotor bearing bushings 68, 70, which may be constructed from metal. The rotor bearing bushings 68, 70 may be fixedly connected with and mounted, such as welded, to the respective first and second cap skeleton portions 64, 66 to support the respective rotor bearings 34-1, 34-2.

In the embodiments of the structural skeleton 52 shown in FIG. 9, the rotor bearing bushings 68, 70 may be mounted to the respective first and second skeleton portions 52-1, 52-2. Furthermore, as shown in FIG. 4, the rotor bearing bushings 68, 70 may be arranged in the respective housing caps 60, 62. In such an embodiment, the first and second skeleton portions 52-1, 52-2 may be embedded in respective attachable housing caps 60, 62. In the embodiment of FIG. 4, the rotor 30 may be loaded into the stator assembly 36 from the side of either the housing cap 60 or the housing cap 62. Alternatively, as shown in FIG. 2, the stator assembly 36 may include one of the first and second housing caps 60, 62, but not the other, such as the first cap 60 mounted to the stator housing 38, with the rotor bearing bushing 68 arranged in the subject cap. In such an embodiment, the first skeleton portion 52-1 may be embedded in the attachable housing cap 60. Additionally, as also shown in FIG. 2, the stator housing 38 includes an open side 38A and a closed side 38B. In such an embodiment, the rotor bearing bushing 68 may then be mounted to the first housing cap 60 to thereby support the rotor bearing 34-1 at least in part by the first skeleton portion 52-1, and embedded in the open side 38A of the stator housing 38. Furthermore, the rotor bearing bushing 70 may be mounted to the structural skeleton 52 in the closed side 38B of the stator housing 38. In the embodiment of FIG. 2, the rotor 30 may be loaded into the stator assembly 36 from the open side 38A of the stator housing 38.

Figure 11:
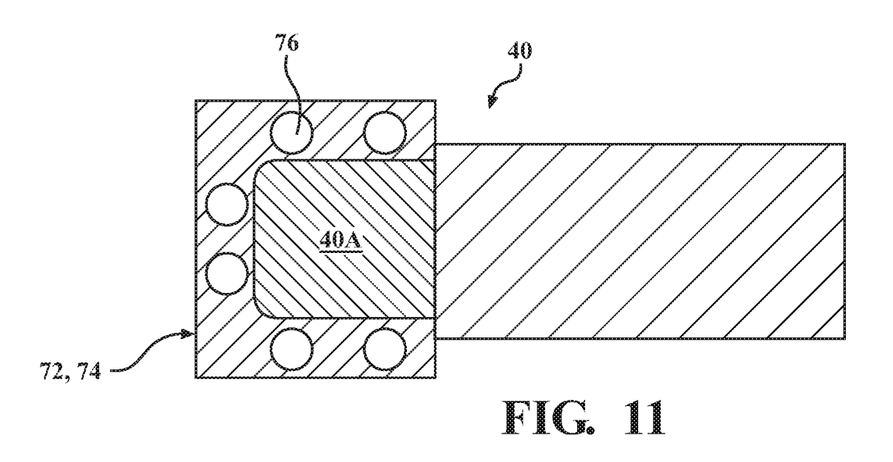
FIG. 11 is a schematic partial cross-sectional side view of the stator assembly including a winding end cap having fluid passages and encapsulating the winding end-turns on the wire windings.

As shown in FIG. 11, the stator assembly 36 may also include winding end caps 72, 74 arranged on and configured to encapsulate the winding end-turns 40A on the respective sides of the wire windings 40. Each winding end cap 72, 74 has one or more fluid passages 76 in fluid communication with the conduit 50 and configured to receive and circulate fluid around the winding end-turns 40A for heating and/or cooling the subject end-turns. Each winding end cap 72, 74 may be molded from a polymer material and have the fluid passages 76 defined by the respective winding end cap structure as a result of the molding process.

Figure 12:
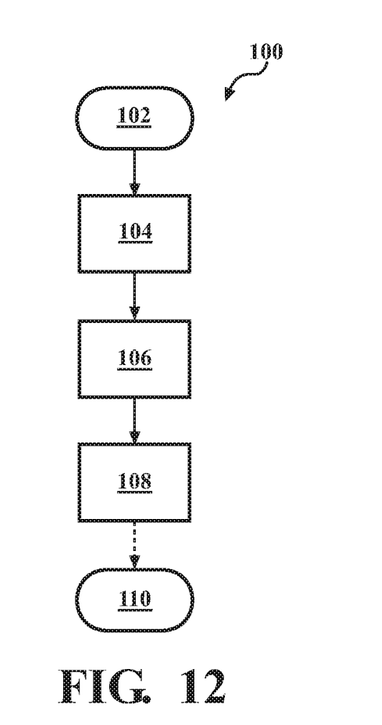
FIG. 12 is a flow diagram of a method of generating a stator assembly for the electric motor shown in FIGS. 1-11.

FIG. 12 depicts a method 100 of generating the stator assembly 36 for an electric motor, such as for the motor/generator 14, as described above with respect to FIGS. 1-11. The method commences in frame 102 with preassembling the structural skeleton 52, such as described with respect to FIGS. 6 and 7. Specifically, the first set of members 56 may be connected and fixed relative to the second set of members 58. For example, the first and second sets of members 56, 58 may be connected and fixed relative to each other. Such a connection may be maintained via an adhesive or a weld to hold the structural skeleton 52 together prior to being placed in a mold fixture. Alternatively, the first and second set of members 56, 58 may be affixed to one another using complementary geometries, such as one or more notches 59, and snapped together to maintain relative position of the first and second set of members until the structural skeleton 52 is joined with the stator housing 38.

After frame 102, the method proceeds to frame 104 with arranging the structural skeleton 52 with the laminate steel core 42 in a mold fixture (not shown). Following frame 104, the method advances to frame 106. In frame 106, the method includes arranging the laminate steel core 42 and the structural skeleton 52 sub-assembly in the mold fixture. After frame 106 the method advances to frame 108. In frame 108, the method includes over-molding the laminate steel core 42 and the structural skeleton 52 sub-assembly with stator housing 38 polymeric material to form the stator assembly 36. Alternatively, the first skeleton portion 52-1 and/or the second skeleton portion 52-2 of the structural skeleton 52 may be attached to the stator housing 38 after the laminate steel core 42 and the structural skeleton 52 sub-assembly has been over-molded with stator housing 38 polymeric material.

The method may complete in frame 110 with thus reinforced stator assembly 36 being removed from the mold, de-flashed, and prepared for the final assembly of the motor-generator 14. The rotor 30 may be inserted into thus generated stator assembly 36 and fastening to the stator assembly 36 either one or both of the first and second housing caps 60, 62 to assemble the motor-generator 14.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A stator assembly for an electric motor, the stator comprising:
    a laminate steel core arranged on an axis;
    a fluid inlet and a fluid outlet;
    a stator housing arranged on the axis concentrically with respect to the laminate steel core, wherein the stator housing has a conduit fluidly connected to each of the fluid inlet and the fluid outlet and configured to circulate fluid around the laminate steel core; and
    a structural skeleton embedded in the stator housing and thereby configured to reinforce the stator housing.

2. The stator assembly according to claim 1, wherein the stator housing is fixed to the laminate steel core via an interlocking feature.

3. The stator assembly according to claim 2, wherein the interlocking feature includes serrations extending along the axis and in positive engagement with the stator housing.

4. The stator assembly according to claim 1, wherein the stator housing is constructed from a polymeric material.

5. The stator assembly according to claim 1, wherein the structural skeleton is constructed from a continuous fiber composite, metal, or polymeric material.

6. The stator assembly according to claim 1, wherein the structural skeleton includes a first set of members extending along the axis and a second set of members arranged at a non-zero angle with respect to the axis, and wherein the second set of members is fixed to the first set of members via an adhesive or a weld, or by being snapped together.

7. The stator assembly according to claim 1, wherein the structural skeleton is directly affixed to the laminate steel core.

8. The stator assembly according to claim 7, further comprising:
    a rotor bearing;
    a housing cap mounted to the stator housing; and
    a rotor bearing bushing configured to support the rotor bearing, embedded in the housing cap, and fixedly connected with the structural skeleton.

9. The stator assembly according to claim 1, wherein the structural skeleton extends along the axis through the stator housing.

10. The stator assembly according to claim 1, further comprising:
    wire windings arranged on and supported by the laminate steel core and having winding end-turns; and
    an end cap arranged on and configured to encapsulate the winding end-turns, wherein the end cap has a fluid passage in fluid communication with the conduit and configured to circulate fluid around the winding end-turns.

11. An electric motor comprising:
    a stator assembly; and
    a rotor configured to rotate within the stator assembly about an axis;
    wherein the stator assembly includes:
        a laminate steel core arranged on the axis;
        a fluid inlet and a fluid outlet;
        a stator housing arranged on the axis concentrically with respect to the laminate steel core, wherein the stator housing has a conduit fluidly connected to each of the fluid inlet and the fluid outlet and configured to circulate fluid around the laminate steel core; and
        a structural skeleton embedded in the stator housing and thereby configured to reinforce the stator housing.

12. The electric motor according to claim 11, wherein the stator housing is fixed to the laminate steel core via an interlocking feature.

13. The electric motor according to claim 12, wherein the interlocking feature includes serrations extending along the axis and in positive engagement with the stator housing.

14. The electric motor according to claim 11, wherein the stator housing is constructed from a polymeric material.

15. The electric motor according to claim 11, wherein the structural skeleton is constructed from a continuous fiber composite, metal, or polymeric material.

16. The electric motor according to claim 11, wherein the structural skeleton includes a first set of members extending along the axis and a second set of members arranged at a non-zero angle with respect to the axis, and wherein the second set of members is fixed to the first set of members via an adhesive or a weld, or by being snapped together.

17. The electric motor according to claim 11, wherein the structural skeleton is directly affixed to the laminate steel core.

18. The electric motor according to claim 17, wherein the stator assembly additionally includes:
    a rotor bearing;
    a housing cap mounted to the stator housing; and
    a rotor bearing bushing configured to support the rotor bearing, embedded in the housing cap, and fixedly connected with the structural skeleton.

19. The electric motor according to claim 11, wherein the structural skeleton extends along the axis through the stator housing.

20. The electric motor according to claim 11, wherein the stator assembly additionally includes:
    wire windings arranged on and supported by the laminate steel core and having winding end-turns; and
    an end cap arranged on and configured to encapsulate the winding end-turns, wherein the end cap has a fluid passage in fluid communication with the conduit and configured to circulate fluid around the winding end-turns.

* * * * *